US012327505B2

(12) United States Patent
Boo et al.

(10) Patent No.: US 12,327,505 B2
(45) Date of Patent: Jun. 10, 2025

(54) DISPLAY DEVICE AND CONTROL METHOD THEREFOR

(71) Applicant: SAMSUNG ELECTRONICS CO., LTD., Suwon-si (KR)

(72) Inventors: Chanhyuk Boo, Suwon-si (KR); Youngkook Kim, Suwon-si (KR); Jeongryeol Seo, Suwon-si (KR); Jung Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/635,812

(22) Filed: Apr. 15, 2024

(65) Prior Publication Data

US 2024/0304127 A1 Sep. 12, 2024

Related U.S. Application Data

(63) Continuation of application No. PCT/KR2022/018960, filed on Nov. 28, 2022.

(30) Foreign Application Priority Data

Nov. 30, 2021 (KR) .................. 10-2021-0169129

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2300/026* (2013.01);
(Continued)

(58) Field of Classification Search
CPC .... G09G 3/006; G09G 3/32; G09G 2300/026; G09G 2330/021; G09G 2330/027;
(Continued)

(56) References Cited

U.S. PATENT DOCUMENTS 9,082,343 B2 6/2015 Park
10,157,587 B2 12/2018 Park et al.
(Continued)

FOREIGN PATENT DOCUMENTS

CN 102654967 A 9/2012
JP 2005-261768 A 9/2005
(Continued)

OTHER PUBLICATIONS

International Search Report and Written Opinion issued Mar. 23, 2023 in International Application No. PCT/KR2022/018960.
(Continued)

*Primary Examiner* — Dmitriy Bolotin
(74) *Attorney, Agent, or Firm* — Sughrue Mion, PLLC

(57) ABSTRACT

A modular display device includes: a plurality of display modules, wherein each of the plurality of display modules includes a plurality of light emitting elements, a plurality of drivers configured to drive the plurality of light emitting elements; a power supply device; a converter configured to supply a driving voltage to the plurality of drivers of each of the plurality of display modules based on a voltage output by the power supply device; and a processor configured to: detect whether a voltage supplied to the power supply device was turned off based on the voltage output by the power supply device and provided to the converter, and based on detecting that the voltage supplied to the power supply device was turned off, provide a reset signal for resetting the plurality of drivers to the plurality of drivers of each of the plurality of display modules.

7 Claims, 10 Drawing Sheets

(52) U.S. Cl.
CPC . *G09G 2330/021* (2013.01); *G09G 2330/027* (2013.01); *G09G 2330/12* (2013.01)

(58) Field of Classification Search
CPC ........... G09G 2330/12; G09G 2330/02; G09G 2330/028; G09G 5/003; G09G 2330/025; G06F 3/1438; G06F 3/1446
See application file for complete search history.

(56) References Cited

U.S. PATENT DOCUMENTS

| | | | |
|---|---|---|---|
| 10,907,778 B2 | 2/2021 | Pahlevaninezhad et al. | |
| 10,991,297 B2 | 4/2021 | Lee et al. | |
| 2007/0000849 A1* | 1/2007 | Lutz | G09F 9/33 211/26 |
| 2008/0204441 A1* | 8/2008 | Song | G09G 3/2927 345/60 |
| 2012/0032929 A1* | 2/2012 | Cho | G06F 3/1446 345/1.3 |
| 2015/0186099 A1* | 7/2015 | Hall | G09G 3/2096 345/1.3 |
| 2017/0236470 A1* | 8/2017 | Miki | G09G 3/3233 345/690 |
| 2019/0265939 A1* | 8/2019 | Foster | H05K 5/0256 |
| 2019/0371421 A1 | 12/2019 | Zheng et al. | |
| 2020/0074920 A1* | 3/2020 | Lee | G09G 3/3208 |
| 2020/0126476 A1 | 4/2020 | Joo et al. | |
| 2020/0183210 A1* | 6/2020 | Zhang | G02F 1/13306 |
| 2020/0271286 A1* | 8/2020 | Pahlevaninezhad | G09G 3/32 |

FOREIGN PATENT DOCUMENTS

| | | |
|---|---|---|
| JP | 5332762 B2 | 11/2013 |
| JP | 6496573 B2 | 4/2019 |
| KR | 10-1997-0078463 A | 12/1997 |
| KR | 0165699 B1 | 12/1998 |
| KR | 1999-0058363 A | 7/1999 |
| KR | 10-2012-0013777 A | 2/2012 |
| KR | 10-1481570 B1 | 1/2015 |
| KR | 10-2017-0003847 A | 1/2017 |
| KR | 10-2018-0104399 A | 9/2018 |
| KR | 10-2018-0120344 A | 11/2018 |
| KR | 10-2019-0031938 A | 3/2019 |
| KR | 10-2019-0131072 A | 11/2019 |

OTHER PUBLICATIONS

International Search Report and Written Opinion issued Mar. 22, 2023 in International Application No. PCT/KR2022/018960.
Communication dated Nov. 19, 2024 issued by the European Patent Office in European Patent Application No. 22901702.5.
Communication dated Dec. 18, 2024 issued by the Korean Intellectual Property Office in Korean Patent Application No. 10-2021-0169129.
Ablic Inc, "Introduction—What is a Reset IC?", Aug. 15, 2020, XP093221902, pp. 1-12 (12 pages total).

* cited by examiner

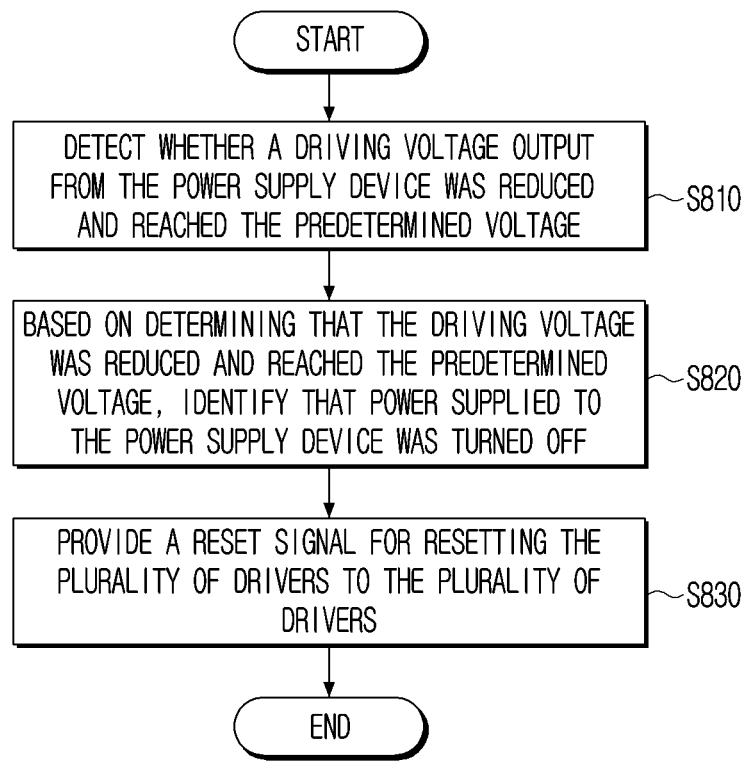

DISPLAY DEVICE AND CONTROL METHOD THEREFOR

CROSS-REFERENCE TO RELATED APPLICATIONS

This application is a bypass continuation of International Application No. PCT/KR2022/018960, filed on Nov. 28, 2022, in the Korean Intellectual Property Receiving Office, which claims priority to Korean Patent Application No. 10-2021-0169129, filed on Nov. 30, 2021, in the Korean Intellectual Property Office, the disclosures of which are incorporated by reference herein in their entireties.

BACKGROUND

1. Field

The disclosure relates to a display device and a control method therefor, and more particularly, to a modular display device consisting of a plurality of display modules, and a control method therefor.

2. Description of Related Art

Development of display technologies has also diversified the sizes of the screens of display devices. In the past, only production of display devices in limited sizes was possible, but recently, production of display devices having large screens became possible, departing from the limitation of the sizes of displays, and accordingly, use of display devices having large screens is increasing in real life.

In particular, use of a modular display device providing an extended display screen by combining a plurality of display modules is increasing. For example, display devices having large screens include digital signage billboards that are installed in places wherein there is a lot of floating population such as subway stations, bus stops, etc., and then display outdoor advertisements through display devices. A modular display device can extend or reduce the size of a display screen flexibly according to the number of display modules and their combined relation, and thus it provides convenience to a user who uses a large display device.

In the case of a plurality of display modules constituting a modular display device, ev en if they are produced by the same manufacturing process, they may have different characteri stics from one another due to environmental factors such as the temperature, the humidity, etc. at the time of production of each display module or components included in each display mo dule (e.g., light emitting elements). This may be caused by various factors other than environ mental factors, and due to this, a user may have difficulty in controlling a modular display dev ice implemented as a plurality of display modules. For example, a phenomenon wherein light emitting elements of some display modules are not turned off even though the user turned off the power of the modular display device, and still emit light falls under this. In particular, suc h a phenomenon is visible to a degree that the user can recognize it even though it occurs duri ng a very short time, and due to this, a result that the user misrecognizes that the modular disp lay device malfunctioned is caused.

SUMMARY

Provided is a display device which detects that the power of a voltage supply device providing a voltage to a plurality of display modules was turned off, and stops the operation of drivers driving the plurality of display modules.

According to an aspect of the disclosure, a modular display device includes: a plurality of display modules, wherein each of the plurality of display modules includes a plurality of light emitting elements, a plurality of drivers configured to drive the plurality of light emitting elements; a power supply device; a converter configured to supply a driving voltage to the plurality of drivers of each of the plurality of display modules based on a voltage output by the power supply device; and a processor configured to: detect whether a voltage supplied to the power supply device was turned off based on the voltage output by the power supply device and provided to the converter, and based on detecting that the voltage supplied to the power supply device was turned off, provide a reset signal for resetting the plurality of drivers to the plurality of drivers of each of the plurality of display modules.

The processor may include a detection circuit configured to, based on the voltage output by the power supply device being reduced as the voltage supplied to the power supply device was turned off and reaching a predetermined voltage, output the reset signal for resetting the plurality of drivers.

The detection circuit may be further configured to detect whether the voltage output by the power supply device is reduced and reaches the predetermined voltage by using a Zener diode, and a breakdown voltage of the Zener diode is the same as the predetermined voltage.

The detection circuit may include: a Zener diode including an anode terminal and a cathode terminal that is configured to receive an input of the voltage output by the power supply device; a first resistance including a first end connected to the anode terminal of the Zener diode and a second end; a second resistance including a first end connected to the second end of the first resistance and of which a second end of the second resistance connected to a ground; a capacitor including a first end is commonly connected to the second end of the first resistance and the first end of the second resistance, and a second end connected to the ground; a third resistance including a first end configured to receive an input of a first voltage and a second end; and an AND gate including a first input end connected to the second end of the third resistance, a second input end commonly connected to the second end of the first resistance, the first end of the second resistance, and the first end of the capacitor, and an output end configured to output the reset signal.

The AND gate may be configured to, based on the voltage output by the power supply device being reduced and reaching the predetermined voltage, output the reset signal having a low level.

The plurality of drivers may be further configured to, based on the reset signal being received, stop operations according to the reset signal.

The processor may be further configured to detect whether the power supplied to the power supply device was turned off by detecting whether a plug of the power supply device was detached from a receptacle.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a schematic flow chart of a control method for a display device according to an embodiment of the disclosure.

DETAILED DESCRIPTION

Figure 1:
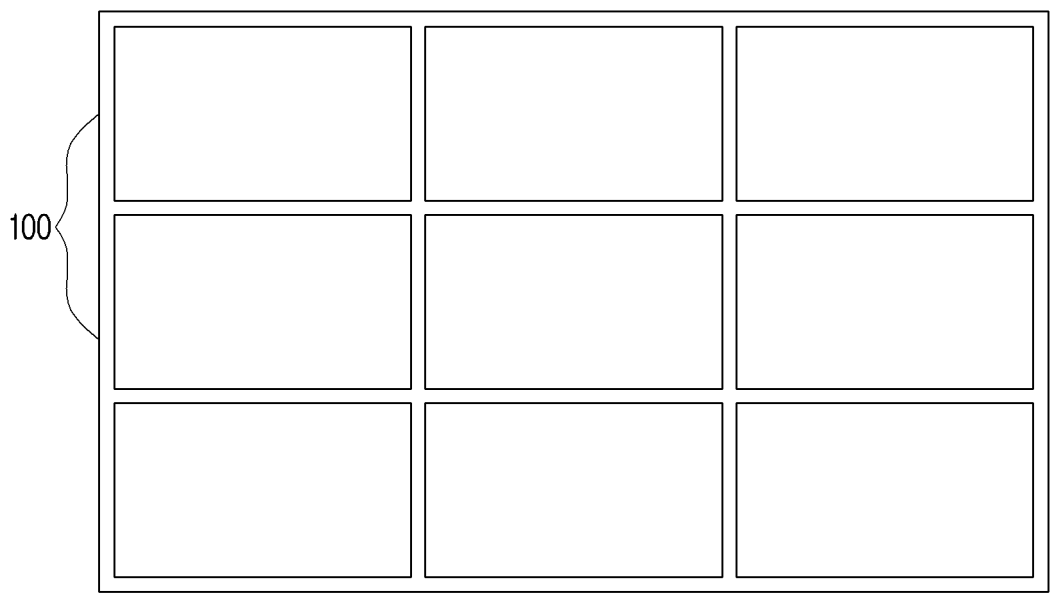
FIG. 1 is an exemplary diagram of a modular display device according to an embodiment of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, expressions such as "have," "may have," "include," and "may include" denote the existence of such characteristics (e.g.: elements such as numbers, functions, operations, and components), and do not exclude the existence of additional characteristics.

In addition, the expression "at least one of A or B" should be interpreted to mean any one of "A" or "B" or "A and B."

Further, the expressions "first," "second," and the like used in the disclosure may be used to describe various elements regardless of any order and/or degree of importance. Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case in which the one element is directly coupled to the another element, and the case in which the one element is coupled to the another element through still another element (e.g.: a third element).

In addition, singular expressions also include plural expressions as long as they do not obviously mean differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or "parts" may be integrated into at least one module and implemented as at least one processor, except "modules" or "parts" which are to be implemented as hardware.

In addition, in the disclosure, the term 'user' may refer to a person who is provided with a content through a display device, but is not limited thereto.

FIG. 1 is an exemplary diagram of a modular display device according to an embodiment of the disclosure.

Referring to FIG. 1, a modular display device 1000 includes a plurality of display modules 100 according to an embodiment of the disclosure.

According to an embodiment of the disclosure, the modular display device 1000 may be implemented as one large display device such as digital signage, an electronic display, etc., wherein the plurality of display modules 100 are combined or assembled, or one small display device such as a monitor for personal computers (PCs), a TV, etc., but is not limited thereto.

The plurality of display modules 100 are disposed in a matrix form, and constitute one modular display device 1000. In FIG. 1, it was illustrated that nine display modules constitute the modular display device 1000, but it is possible that the modular display device 1000 in any different sizes or any different resolutions can be implemented as the display modules 100 in various numbers are combined. Not only that, for implementing the modular display device 1000, the plurality of display modules 100 may be disposed in various matrix forms other than the matrix form of 3×3 illustrated in FIG. 1. That is, according to an embodiment of the disclosure, the plurality of display modules may be disposed in a matrix of M×N (M and N are natural numbers which are greater than or equal to 1).

The plurality of display modules 100 are provided with a driving voltage from a power supply device 200 of the modular display device 1000. The power supply device 200 respectively provides a driving voltage (V_LED, V_DD) to light emitting elements 110 and drivers 120 of each display module 100. Accordingly, when the power of the power supply device 200 is turned off, the driving voltage provided to the display module 100 is also cut off, and thus the operation of the display module 100 is also stopped, or the power is turned off.

Here, in case the turning off of the power of the power supply device 200 was caused by turning off of an AC power provided to the power supply device 200 (e.g., in case a plug of the power supply device 200 connected to an AC receptacle providing a voltage to the power supply device 200 was separated), a voltage output from the power supply device 200 is gradually reduced as time passes. Then, the output voltage of the power supply device 200 ultimately reaches 0V (voltage). As the output voltage of the power supply device 200 is gradually reduced as the AC power of the power supply device 200 is turned off, the driving voltages of the light emitting elements 110 and the drivers 120 of the display modules driven based on the output voltage provided from the power supply device 200 are also gradually reduced as time passes. Also, the driving voltages of the light emitting elements 110 and the drivers 120 of the display modules reach 0V after a time passes. Due to this, a phenomenon wherein control of the display modules by a processor 400 is lost occurs in the modular display device 1000.

Figure 2:
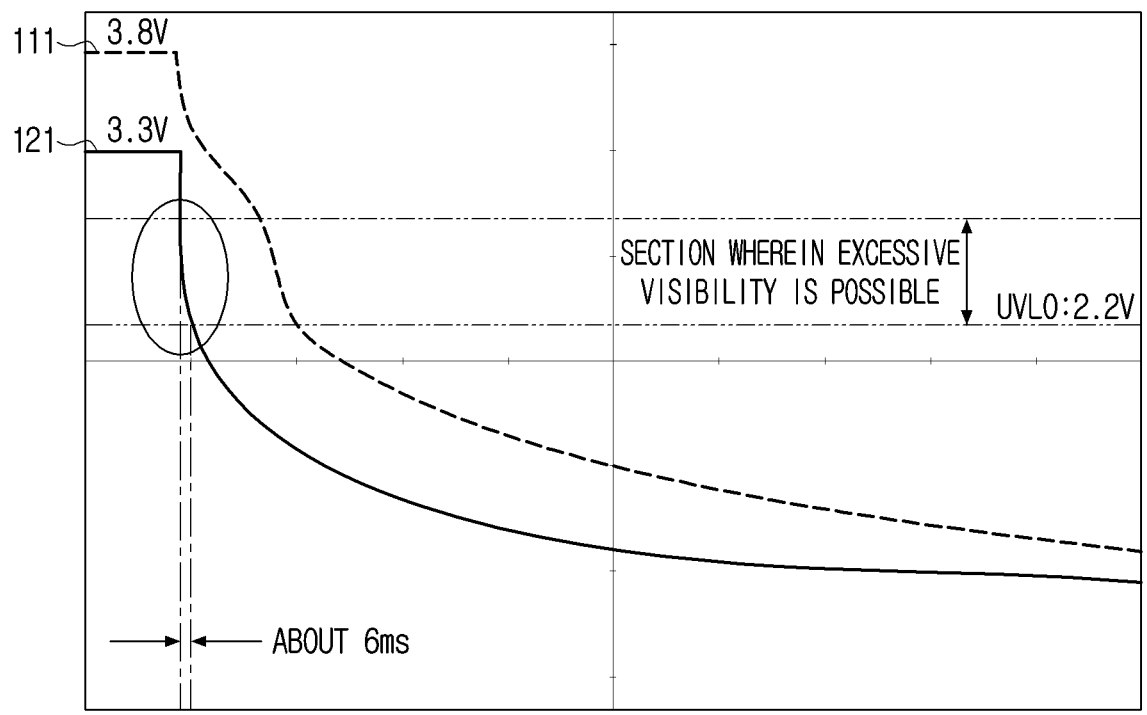
FIG. 2 is a diagram illustrating a change of a driving voltage of light emitting elements and a driver in case a voltage provided from a voltage supply device was turned off.

Referring to FIG. 2, if it is assumed that a driving voltage (V_LED) provided to the light emitting elements 110 is 3.8V, and a driving voltage (V_DD) provided to the drivers 120 is 3.3V, in case the power plug of the power supply device 200 of the modular display device 1000 connected to the AC receptacle was detached, as the output voltage of the power supply device 200 is gradually reduced, the driving voltage (V_LED) 111 provided to the light emitting elements 110 and the driving voltage (V_DD) 121 provided to the drivers 120 are also gradually reduced.

Here, referring to FIG. 2, according to the driving method of the drivers 120 that transmit gate and data signals to the light emitting elements 110, in the display modules, the driving voltage (V_DD) 121 provided to the drivers 120 start to be reduced earlier than the driving voltage (V_LED) 111 provided to the light emitting elements 110. Due to this, during a time of about 6 ms that is spent until the driving voltage of the drivers 120 reaches a threshold voltage (under voltage-lockout (UVLO)) at which the drivers 120 stop operating, the driving voltage is still provided to the light emitting elements 110. Ultimately, a phenomenon wherein the light emitting elements 110 are turned on during the time of about 6 ms, even though the power of the power supply device 200 was turned off, occurs.

Figure 3:
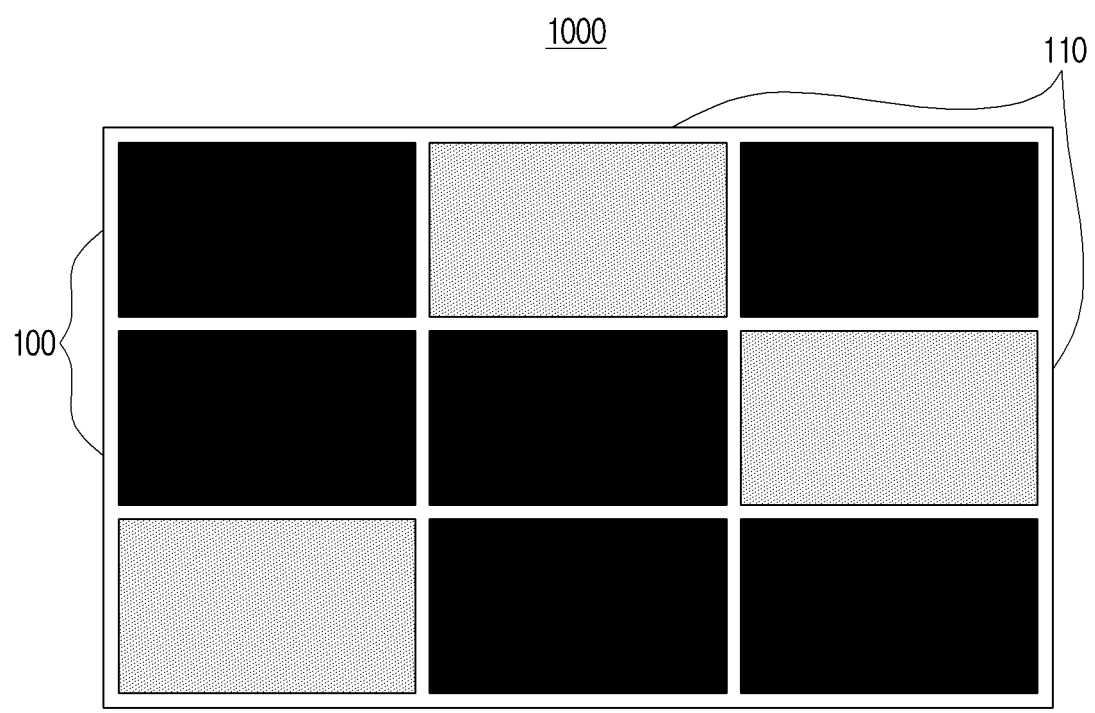
FIG. 3 is an exemplary diagram for illustrating an abnormal phenomenon of light emitting elements in case a voltage provided from a voltage supply device was turned off.

Referring to FIG. 3, it can be known that, even though the power of the power supply device 200 of the modular display device 1000 was turned off, three display modules 100-1 among the plurality of display modules 100 constituting the modular display device 1000 are still not turned off. Such a phenomenon occurs temporarily for about 6 ms, but is visible to a user who uses the modular display device 1000, and in particular, it causes a result that the user misrecognizes that the power of the modular display device 1000 was not turned off. Accordingly, for resolving such a problem, an embodiment of the disclosure provides the modular display device 1000 which, in case an AC power for the power supply device 200 of the modular display device 1000 was turned off, immediately detects this and performs control to stop operating or turning off the power without being dependent on the driving voltage of the plurality of display modules 100. Hereinafter, an embodiment of the disclosure will be described in detail with reference to FIG. 4 to FIG. 8.

Figure 4:
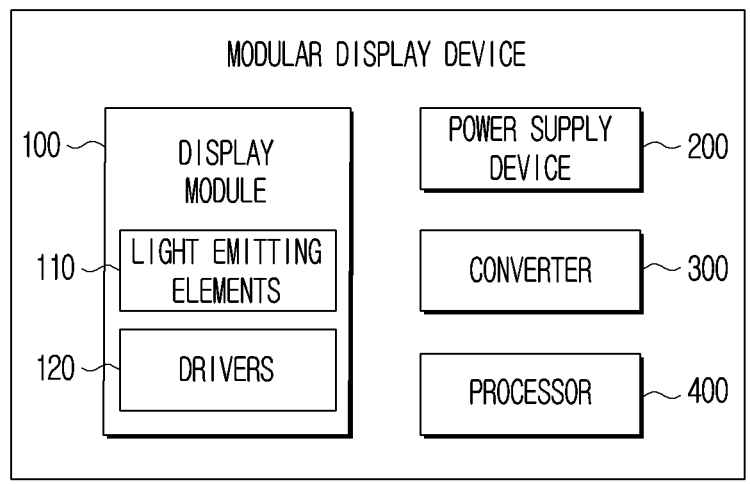
FIG. 4 is a schematic configuration diagram of a modular display device including a plurality of display modules according to an embodiment of the disclosure.
Figure 5:
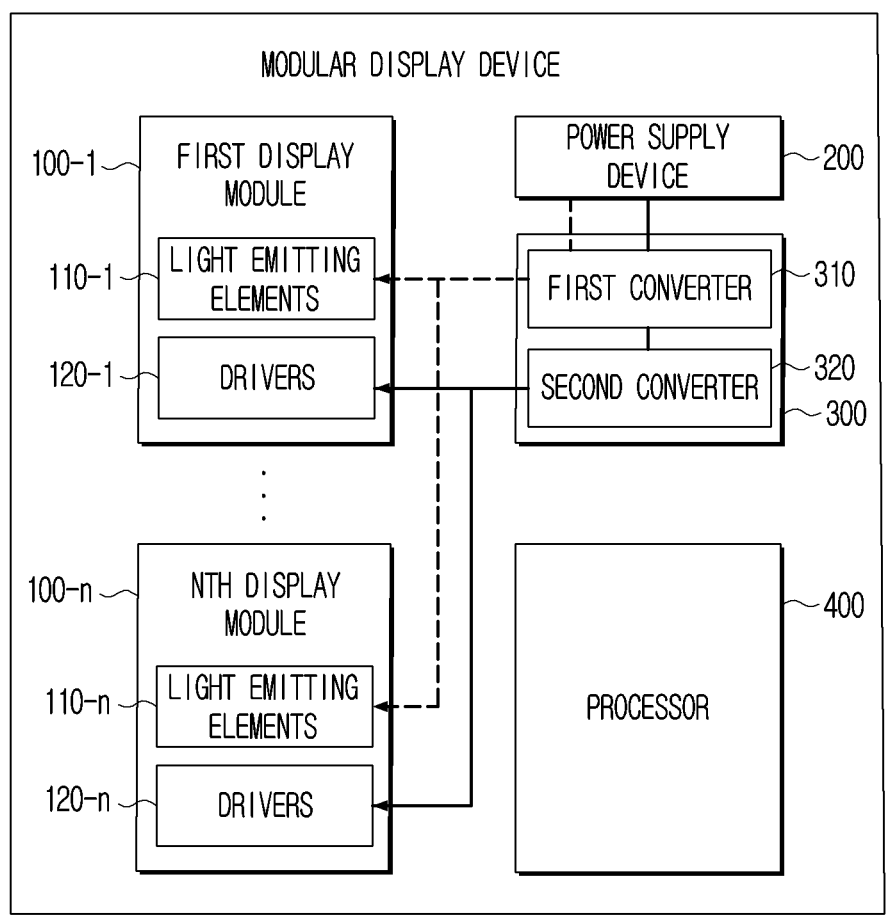
FIG. 5 is a diagram schematically illustrating a power supply device of a modular display device according to an embodiment of the disclosure providing a driving voltage to a plurality of display modules.

FIG. 4 is a schematic configuration diagram of a modular display device including a plurality of display modules according to an embodiment of the disclosure. FIG. 5 is a diagram schematically illustrating a power supply device of a modular display device according to an embodiment of the disclosure providing a driving voltage to a plurality of display modules.

Referring to FIG. 4, according to an embodiment of the disclosure, the modular display device 1000 includes a plurality of display modules, a power supply device 200, and a processor 400. Also, each of the plurality of display modules constituting the modular display device 1000 includes a plurality of light emitting elements 110 and a plurality of drivers 120 for driving the plurality of light emitting elements 110.

First, the plurality of light emitting elements 110 constitute the pixels of the display module. Specifically, the display module may include a plurality of pixels disposed (or arranged) in a matrix form, i.e., a pixel array, and here, each pixel of the pixel array may include three kinds of sub-pixels which are a red (R) sub-pixel 20-1, a green (G) sub-pixel 20-2, and a blue (B) sub-pixel 20-3. Also, each pixel may include a plurality of light emitting elements 110 constituting the sub-pixels. For example, each pixel 10 may include three kinds of light emitting elements 110 which are an R light emitting element 110 constituting the R sub-pixel, a G light emitting element 110 constituting the G sub-pixel, and a B light emitting element 110 constituting the B sub-pixel.

The drivers 120 drive the plurality of light emitting elements 110 such that the display module displays an image. The drivers 120 adjust the brightness of the display module by adjusting a pulse width of a driving current provided to the plurality of light emitting elements 110 according to a duty ratio. Also, the drivers 120 generate an image data voltage based on image data provided from the processor 400, and provide or apply the generated image data voltage to the display module 100. The drivers 120 may provide various kinds of gate signals for driving the pixels on the pixel array, or data signals for providing an image data voltage (e.g., a constant current source data voltage or a PWM data voltage) to each pixel (or each sub-pixel).

Each display module 100 includes a plurality of drivers 120 based on a local dimming method, and here, the plurality of drivers 120 included in one display module drive each of the plurality of light emitting elements 110 that are not overlapped. For example, it is assumed that one display module includes 240 pixels. Here, each pixel includes three light emitting elements 110 (a red light emitting element 110-R, a green light emitting element 110-G, and a blue light emitting element 110-B). That is, one display module includes 720 light emitting elements 110 in total. Here, the plurality of drivers 120 of the display module drive each of the 720 light emitting elements 110 by separating them such that they are not overlapped. If it is assumed that each display module includes four drivers 120, each driver 120 will drive 180 light emitting elements 110.

The modular display device 1000 includes the power supply device 200. The power supply device 200 provides a driving voltage to the plurality of drivers 120 and the plurality of light emitting elements 110. A power supply part 210 may receive an input of an AC voltage and then generate a rectified DC voltage, and provide a driving voltage to the light emitting elements 110 and the drivers 120 provided in the display module. For this, the power supply device 200 may be implemented as a switched mode power supply (SMPS) which is a component converting a commercial power such as 110V, 220V, etc. into a voltage that is needed inside the display device.

According to an embodiment of the disclosure, the modular display device 1000 may further include a plurality of converters 300 (e.g., DC-DC converters) corresponding to each component, element, etc. included in the modular display device 1000. The plurality of converters 300 receive an input of a DC voltage output from the power supply device 200, and then generate a DC voltage which is a driving voltage of a corresponding component of each of them.

Referring to FIG. 5, a first converter 310 convers a DC voltage input from the power supply device 200 into a driving voltage (V_LED) supplied to the light emitting elements 110. Specifically, the first converter 310 may receive an input of a DC output voltage of the power supply device 200 that was generated after receiving an input of an AC power, and then generate a DC voltage (V_LED) that was rectified while being balanced such that a current provided to the array of the light emitting elements 110 is identical, and then provide the voltage to each light emitting element 110. Like this, the plurality of display modules are commonly provided with the driving voltage (V_LED) for the plurality of light emitting elements 110 included in each display module from the first converter 310.

Also, a second converter 320 converts a DC voltage input from the power supply device 200 after the power supply device 200 received an input of an AC power into a driving voltage (V_DD) supplied to the drivers 120. Specifically, the second converter 320 receives an input of a DC voltage from the power supply device 200, and then generates a driving voltage (V_DD) of the drivers 120 that was set according to the specifications of the components such as an FET and a TR inside the drivers 120, and provides the voltage to each driver 120. Like this, the plurality of display modules are commonly provided with the driving voltage (V_DD) for the plurality of drivers 120 included in each display module from the second converter 320.

For example, if the power supply device 200 that received an input of an alternating voltage of 220V generates a direct voltage of 19V, and then provides the voltage to each of the first converter 310 and the second converter 320, the first converter 310 converts the voltage into a direct voltage of 3.8V as the driving voltage (V_LED) of the light emitting elements 110, and the second converter 320 converts the voltage into a direct voltage of 3.3V as the driving voltage (V_DD) of the drivers 120, and respectively provides the voltages to the light emitting elements 110 and the drivers 120.

Also, the processor 400 may be electrically connected to the display module and the power supply device 200, and control the overall operations and functions of the modular display device 1000. For example, when driving of the display is performed, the processor 400 provides image data for an input image to the drivers 120 of each display module. Here, the respective image data provided to the drivers 120 of each display module may be pixel data of an image corresponding to the location of each display module, in relation to the arrangement form of each display module, to be more correct, the plurality of display modules. For this, the processor 400 may include a central processing unit (CPU) or an application processor (AP) 400, and may execute one or more software programs stored in the memory 140 according to one or more instructions stored in the memory 140 of the display module 100.

According to an embodiment of the disclosure, the processor 400 may be referred to as various names such as a digital signal processor (DSP), a microprocessor, a central processing unit (CPU), a micro controller unit (MCU), a micro processing unit (MPU), a neural processing unit (NPU), a controller, an application processor (AP), a timing controller (TCON), etc., but in this specification, it will be described as the processor 400.

Also, the processor 400 may be implemented as a system on chip (SoC) and large scale integration (LSI), or implemented in the form of a field programmable gate array (FPGA). In addition, the processor 400 may include a volatile memory such as an SRAM, etc.

The processor 400 detects whether a voltage supplied to the power supply device 200 was turned off based on a voltage output from the power supply device 200, and if it is detected that power supplied to the power supply device 200 was turned off, provides a reset signal for resetting the plurality of drivers 120. Each of the plurality of drivers 120 includes a reset part. The reset part stops the operation of the driver 120 based on the reset signal received from the processor 400. That is, when each driver 120 receives a reset signal from the processor 400, its operation is stopped by the reset part even if provision of a driving voltage from the power supply device 200 is stopped, or a provided driving voltage does not reach the UVLO. When the operation of the driver 120 is stopped, the light emitting operation is stopped even if the voltage provided from the voltage supply device (a driving voltage of the first converter 310 that received an input of an output voltage of the voltage supply device, a driving voltage still provided from the first converter 310 to the plurality of light emitting elements 110 that are driven based on a gate signal and a data signal received from the driver 120) is effective. According to an embodiment of the disclosure, when a reset signal is received, the operations of the plurality of drivers 120 are stopped according to the reset signal. That is, the plurality of drivers 120 included in each display module stops their operations for the light emitting elements 110 when they receive a reset signal, even though the driving voltage of each of them did not reach the UVLO voltage. The plurality of drivers 120 will stop transmission of a gate signal and a data signal provided to the light emitting elements 110.

According to an embodiment of the disclosure, detecting whether a voltage supplied to the power supply device 200 was turned off may be detecting whether the plug of the power supply device 200 was detached from the receptacle that makes an AC voltage provided to the power supply device 200. As described above, only when the plug of the power supply device 200 is separated from the receptacle providing an AC voltage to the power supply device 200, a voltage output from the power supply device 200 is gradually reduced according to time. For example, in case the power switch of the modular display device 1000 was turned off, as an output voltage of the power supply device 200 was not gradually reduced according to time, and power is still provided to components of the modular display device 1000, the processor 400 may provide a reset signal for resetting the plurality of drivers 120 to the plurality of drivers 120 limited to a case wherein the plug of the power supply device 200 was separated from the receptacle that provides an AC voltage to the power supply device 200.

According to an embodiment of the disclosure, the processor 400 may further include a detection circuit 410 which is for, if a driving voltage output from the power supply device 200 is reduced as a voltage supplied to the power supply device 200 was turned off and reaches a predetermined voltage, outputting a reset signal for resetting the plurality of drivers 120.

The processor 400 may further include a detection circuit 410 including a determination part which determines whether a driving voltage output from the power supply device 200 coincides with the predetermined voltage, and an output part which, if it is determined that a driving voltage output from the power supply device 200 coincides with the predetermined voltage, outputs a reset signal to the plurality of drivers 120. The predetermined voltage may be set to be lower than the output voltage of the power supply device 200.

For example, it is assumed that an output voltage of the power supply device 200 is 19V, and the predetermined voltage is 17V. Here, as the plug of the power supply device 200 is separated from the receptacle providing an AC voltage, the output voltage of the power supply device 200 is gradually reduced from 19V. Then, when the output voltage of the power supply device 200 reaches 17V which is the predetermined voltage, the processor 400 outputs a reset signal to the plurality of drivers 120 of the display module. Accordingly, the display module 100 that received the reset signal stops its operation even if the driving voltage does not reach the UVLO voltage.

According to an embodiment of the disclosure, the detection circuit 410 may detect whether a driving voltage is reduced and reaches the predetermined voltage by using the Zener diode. The Zener diode has a difference from a general diode in that it has a characteristic of making a current flow in a reverse direction if a voltage in a reverse direction greater than or equal to a breakdown voltage is applied. According to an embodiment of the disclosure, a breakdown voltage of the Zener diode is set to coincide with the predetermined voltage, and accordingly, it can be identified whether the power of the power supply device 200 was turned off by detecting a current in a reverse direction flowing through the Zener diode.

Explaining again based on the aforementioned example, the breakdown voltage of the Zener diode may be set as 17V which is the predetermined voltage. Also, to the Zener diode, 19V which is the output voltage of the power supply device 200 may be applied as a bias in a reverse direction. Accordingly, while an AC power is supplied to the power supply device 200, a current in a reverse direction flowing through the Zener diode may be detected in the detection circuit 410. Also, as the plug of the power supply device 200 is separated from the receptacle supplying an AC voltage, the output voltage of the power supply device 200 is gradually reduced from 19V, and in case the voltage applied to the Zener diode reaches 17V or lower, the current in a reverse direction flowing through the Zener diode is blocked inside the detection circuit 410. Accordingly, if a current in a reverse direction flowing through the Zener diode cannot be identified in the detection circuit 410, the processor 400 outputs a reset signal to the drivers 120.

Hereinafter, the detection circuit according to an embodiment of the disclosure will be described in detail with reference to FIG. 6 and FIG. 7.

Figure 6:
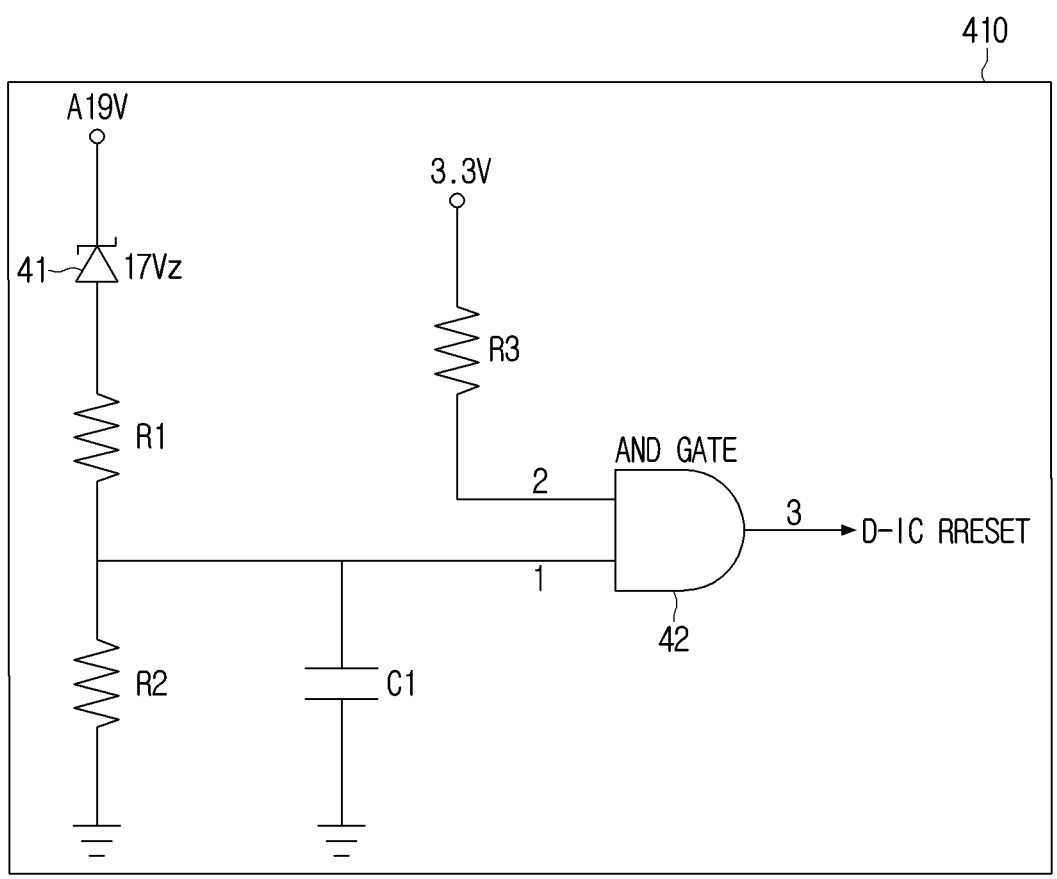
FIG. 6 is a circuit diagram of a detection circuit according to an embodiment of the disclosure.
Figure 7A:
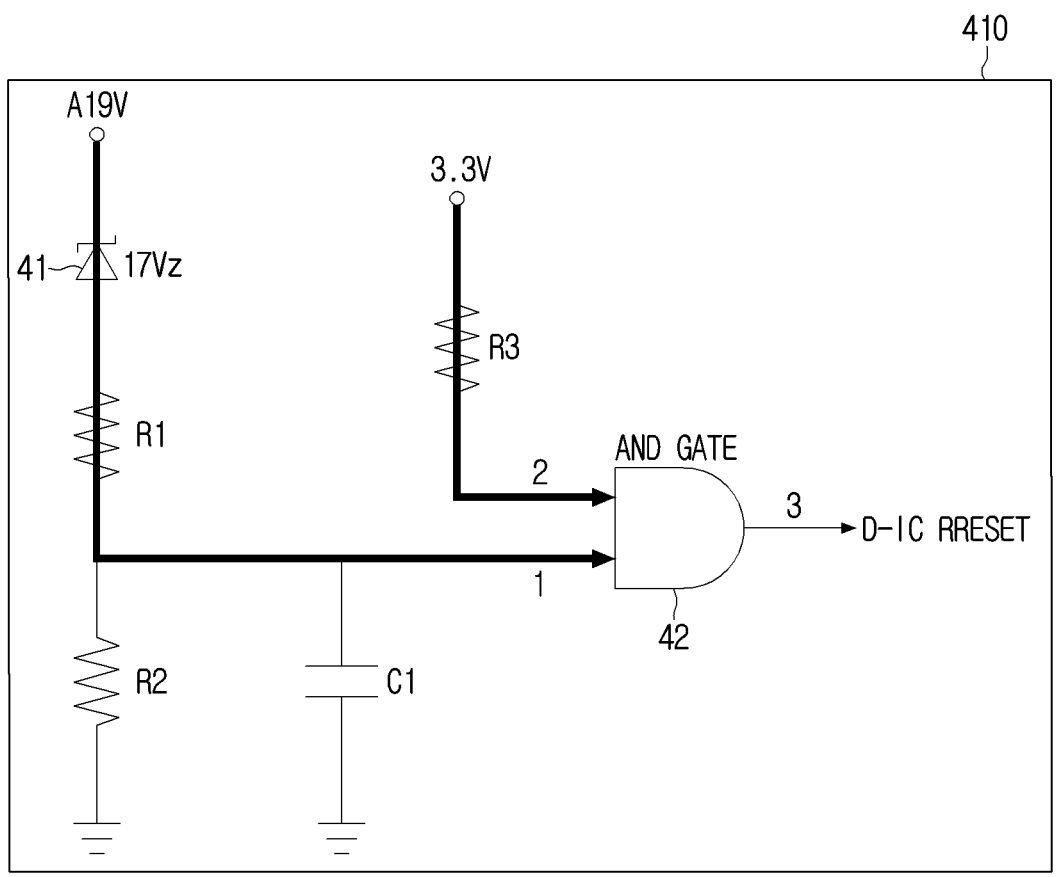
FIG. 7A and FIG. 7B are diagrams for illustrating detecting that an AC power of a power supply device was turned off based on a detection circuit according to an embodiment of the disclosure, and outputting a reset signal to drivers.
Figure 7B:
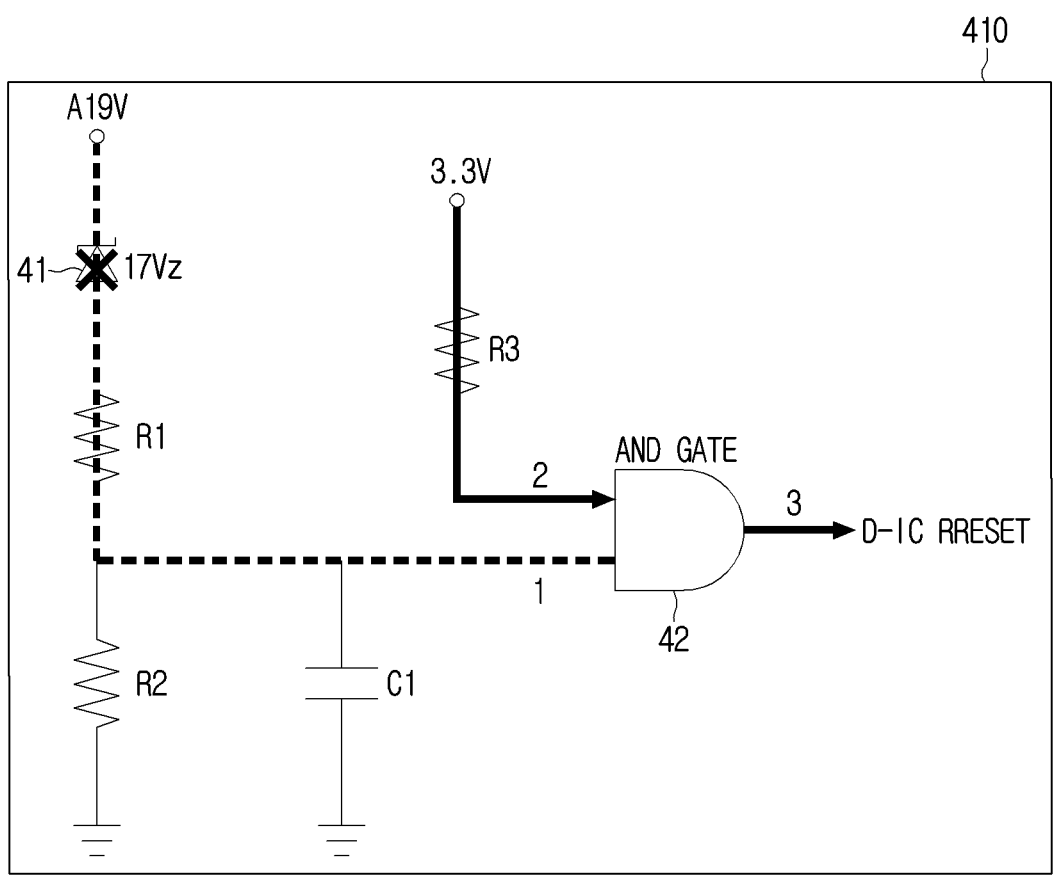

FIG. 6 is a circuit diagram of a detection circuit according to an embodiment of the disclosure, and FIG. 7A and FIG. 7B are diagrams for illustrating detecting that an AC power of a power supply device was turned off based on a detection circuit according to an embodiment of the disclosure, and outputting a reset signal to drivers.

Referring to FIG. 6, according to an embodiment of the disclosure, the detection circuit 410 includes a Zener diode. Here, the Zener diode 41 receives an input of a voltage output from the power supply device 200 through a cathode terminal. Referring to FIG. 5, an output voltage of the power supply device 200 is applied to the Zener diode 41 as a bias in a reverse direction.

The detection circuit 410 includes a first resistance of which one end is connected to an anode terminal of the Zener diode 41, and a second resistance of which one end is connected to the other end of the first resistance and of which other end is connected to a ground. Also, the detection circuit 410 includes a capacitor of which one end is commonly connected to the other end of the first resistance and one end of the second resistance, and of which other end is connected to the ground.

The detection circuit 410 includes a third resistance of which one end receives an input of a first voltage from the power supply device. Although not clearly illustrated in the drawings, for supplying the first voltage input into the third resistance, the modular display device 1000 may further include a converter corresponding to the detection circuit 410 that converts a voltage output from the power supply device 200 into the first voltage. Here, the converter corresponding to the detection circuit 410 (referred to as a third converter hereinafter) may be a DC/DC converter that receives an input of a voltage output from the power supply device 200, and then steps down the input voltage to the first voltage. For example, if it is assumed that a voltage of 19V output from the power supply device 200 was input, the converter corresponding to the detection circuit 410 sequentially steps down the voltage of 19V to 12.8V, and then to 3.3V. Here, the first voltage falls under 3.3V which is the stepped-down final voltage.

The detection circuit 410 includes an AND gate 42 of which first input end is connected to the other end of the third resistance, and of which second input end is commonly connected to the other end of the first resistance, one end of the second resistance, and one end of the capacitor, and of which output end is for outputting the reset signal. Specifically, the AND gate 42 receives an input of a current flowing through the third resistance through the first input end, and the second input end receives an input of a reverse current flowing through the Zener diode 41. Accordingly, while the Zener diode 41 receives a reverse bias from the power supply device 200 (in case the voltage output from the power supply device 200 is greater than or equal to 19V), the reverse current flowing through the Zener diode 41 is input into the second input end of the AND gate 42. Here, when currents are input into both of the first input end and the second input end, the AND gate 42 outputs a control signal of a high level through the output end. The output end of the AND gate 42 may be connected to an input terminal of the reset part of the drivers 120. According to an embodiment of the disclosure, the detection circuit 410 may further include elements other than the Zener diode 41, the resistances, the capacitor, and the AND gate 42 illustrated in FIG. 6.

According to an embodiment of the disclosure, if a driving voltage output from the power supply device 200 is reduced and reaches the predetermined voltage, the AND gate 42 may output a reset signal having a low level. That is, the drivers 120 may be set in advance such that the operations of the drivers 120 are stopped in the case of receiving an input signal of a low level through the input terminal of the reset part.

Referring to FIG. 7A, it is assumed that a DC voltage of 19V is output from the power supply device 200 through an input AC voltage, and the breakdown voltage of the Zener diode 41 is 17V. Here, while receiving an input of the AC voltage, the voltage of 19V output from the power supply device 200 is applied to the Zener diode 41 as a bias in a reverse direction. Also, into the second input end of the AND gate 42, a current in a reverse direction for the Zener diode 41 flowing through the Zener diode 41 gets to be input. In addition, into the first input end of the AND gate 42, a current flowing through the third resistance gets to be input based on the first voltage. Further, when currents are input into both of the first input end and the second input end, the AND gate 42 outputs a control signal of a high level to the drivers 120 through the output end.

Referring to FIG. 7B, if an AC power provided to the power supply device 200 is blocked (if the plug of the power supply device is separated from the receptacle of the AC power), the voltage output from the power supply device 200 is gradually reduced according to time. Also, if the reverse bias applied to the Zener diode 41 reaches the breakdown voltage 17V of the Zener diode 41 due to this, the current in a reverse direction flowing through the Zener diode 41 is blocked. However, in such a case, the current flowing through the third resistance still gets to be input into the first input end of the AND gate 42. The reason for this is that, as the first voltage applied to the third resistance is set as a lower value than the breakdown voltage of the Zener diode 41, even if the voltage applied to the Zener diode 41 coincides with the breakdown voltage as the output voltage is reduced, the first voltage can still be applied to the third resistance. An operating voltage of the converter corresponding to the detection circuit 410 may be set to be lower than the predetermined voltage, i.e., the breakdown voltage set at the Zener diode 41. Explaining again based on the aforementioned example, if it is assumed that the breakdown voltage set at the Zener diode 41 is 17V, the operating voltage of the converter corresponding to the detection circuit 410 may be set as 4.2V which is lower than 17V. Accordingly, even if the voltage output from the power supply device reaches the breakdown voltage (17V) of the Zener diode 41, and the current in a reverse direction flowing through the Zener diode 41 is blocked, the converter corresponding to the detection circuit 410 outputting the first voltage still receives an input of a voltage of 17V higher than 4.2V which is the operating voltage from the power supply device. Then, the first voltage is output normally through the converter corresponding to the detection circuit 410, and accordingly, the current flowing through the third resistance also flows normally in the detection circuit 410.

Into the second input end of the AND gate 42, the current flowing through the Zener diode 41 is not input, and thus a signal of a low level is output at the output end of the AND gate 42. That is, if a signal of a low level is input into the reset part (or the input end corresponding to the reset part) of the driver 120 connected to the output end of the AND gate 42, the driver 120 stops the operation of driving the light emitting elements. Due to this, the light emitting elements 110 cannot receive a gate signal or a data signal for light emission from the driver 120, either, and thus the light emitting elements 110 stop the light emitting operation. Through this, the modular display device 1000 of the disclosure can immediately detect that the plug of the power supply device 200 is separated from the receptacle of the AC power, and simultaneously stop the driving operation of the light emitting elements by the plurality of drivers 120 included in each display module 100.

FIG. 8 is a schematic flow chart of a control method for a display device according to an embodiment of the disclosure.

Referring to FIG. 8, first, the processor 400 detects whether an output voltage of the power supply device 200 is reduced and reaches a predetermined voltage in operation S810. Specifically, if the power supply device 200 converts an input AC voltage into a DC voltage and outputs it, the processor 400 determines whether the output voltage of the power supply device 200 coincides with the predetermined voltage. For this, according to an embodiment of the disclosure, the processor 400 may further include a detection circuit 410, and here, the predetermined voltage may be set as a breakdown voltage of the Zener diode 41 included in the detection circuit 410.

If it is determined that the output voltage was reduced and reached the predetermined voltage, the processor 400 identifies that power supplied to the power supply device 200 was turned off in operation S820. Specifically, if the output voltage is reduced, or the output voltage is reduced and reaches the predetermined voltage, the processor 400 identifies that the alternating voltage supplied to the power supply device 200 was blocked. That is, the processor 400 identifies that the plug of the power supply device 200 was detached from the receptacle of the alternating power.

Then, the processor 400 provides a reset signal for resetting the plurality of drivers to the drivers 120 of each display module in operation S830. Specifically, if it is identified that the power was turned off, the processor 400 provides a signal of a low level to each driver 120 that was set to stop the operation for which a signal of a low level was input. In the aforementioned explanation, the operations S810 to S830 may be further divided into additional steps, or combined into fewer steps depending on the implementation examples of the disclosure. Also, some steps may be omitted depending on needs, and the order among the steps may be changed. Further, the aforementioned contents regarding the modular display device 1000 in FIG. 1 to FIG. 7 can be applied to the control method for the modular display in FIG. 8, including other omitted contents.

Figure 9:
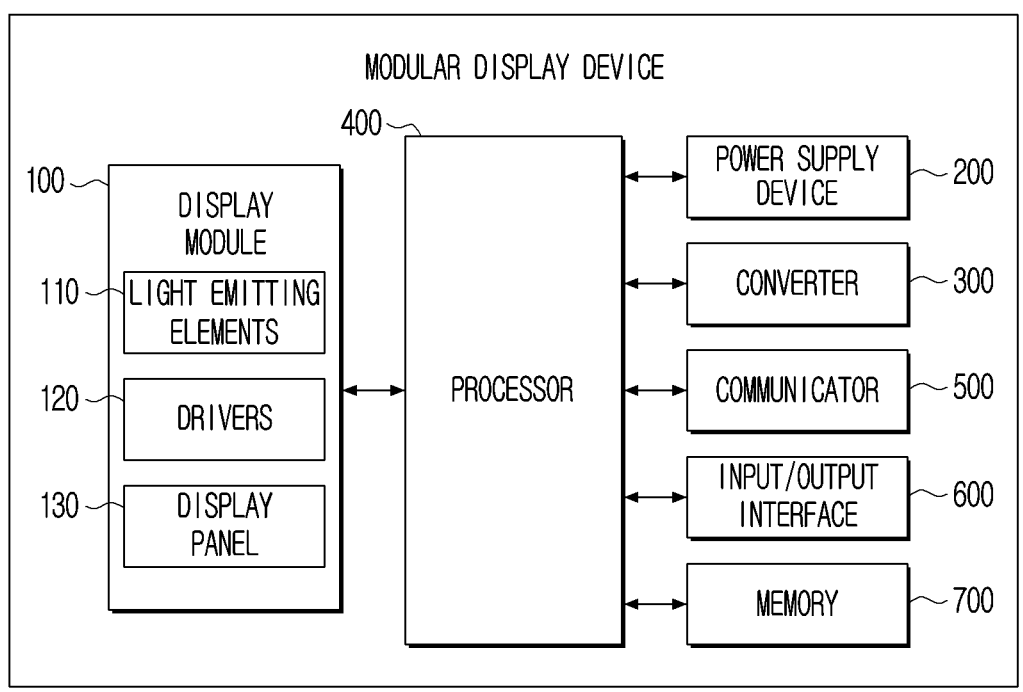
FIG. 9 is a block diagram for illustrating a detailed configuration of a display device according to an embodiment of the disclosure.

FIG. 9 is a block diagram for illustrating a detailed configuration of a display device according to an embodiment of the disclosure.

Referring to FIG. 9, the modular display device 1000 may include a display module 100, a power supply device 200, a converter 300, a processor 400, a communicator 500, an input/output interface 600, and a memory 700. Also, the display module includes light emitting elements 110 and drivers 120. The components illustrated in FIG. 9 are merely an example, and it will be understood that at least some components may be omitted, or other components may be added depending on embodiments.

In addition, as the light emitting elements 110 and the drivers 120 of the display module 100, and the power supply device 200, the converter 300, and the processor 400 of the modular display device 1000 were described in FIG. 1 to FIG. 8, detailed explanation regarding overlapping parts will be omitted.

The communicator 500 is a component that performs communication with an external device. For example, the communicator 500 may perform communication with various external devices through a wireless communication method such as Bluetooth (BT), Bluetooth low energy (BLE), wireless fidelity (WI-FI), Zigbee, etc., or an infrared (IR) communication method. The communicator 500 may not only be mounted on the processor 400, but may also be included in the modular display device 1000 as a separate component from the processor 400.

In this case, the processor 400 may transmit data related to the operations of the modular display device 1000 to an external device through the communicator 500, or receive the data from the external device. In this case, the data received from the external device may be image data or audio data that can be reproduced in the modular display device 1000.

The modular display device 1000 may further include an input/output interface. The input/output interface may be provided to be communicable with another device that was provided separately from the modular display device 1000, e.g., an external storage device. For example, the input/output interface 600 may be a universal serial bus (USB) terminal, and other than this, the input/output interface 600 may include at least one of various terminals for an interface such as a high definition multimedia interface (HDMI) terminal, or a Thunderbolt terminal.

In the memory 700, an operating system (O/S) for driving the modular display device 1000 may be stored. Also, in the memory 700, software programs or applications for the modular display device 1000 or the plurality of display modules 100 to operate according to the various embodiments of the disclosure may be stored. In addition, in the memory 700, various kinds of information such as various kinds of data that is input or set, or generated during execution of the programs or the applications may be stored. For example, in the memory 700, table information for adjusting the resolution of an image according to the number and the arrangement form of the display modules included in the modular display device 1000 may be stored.

Other than the above, the modular display device 1000 may further include a speaker, and the speaker may output an audio signal. For example, the processor 400 may output an audio signal included in audio data through the speaker.

The aforementioned various embodiments may be implemented in a recording medium that can be read by a computer or a device similar to a computer, by using software, hardware, or a combination thereof. In some cases, the embodiments described in this specification may be implemented as the processor 400 itself. According to implementation by software, the embodiments such as processes and functions described in this specification may be implemented as separate software modules. Each of the software modules can perform one or more functions and operations described in this specification.

Computer instructions for performing processing operations of the display module 100 according to the aforementioned various embodiments of the disclosure may be stored in a non-transitory computer-readable medium. Computer instructions stored in such a non-transitory computer-readable medium make the processing operations at the display module 100 according to the aforementioned various embodiments performed by a specific machine, when the instructions are executed by the processor of the machine.

A non-transitory computer-readable medium refers to a medium that stores data semi-permanently, and is readable by machines, but not a medium that stores data for a short moment such as a register, a cache, and a memory. As examples of a non-transitory computer-readable medium, there may be a CD, a DVD, a hard disc, a blue-ray disc, a USB, a memory card, a ROM and the like.

Also, while example embodiments of the disclosure have been shown and described, the disclosure is not limited to the aforementioned embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A modular display device comprising:
    a plurality of display modules, wherein each of the plurality of display modules comprises a plurality of light emitting elements, and a plurality of drivers configured to drive the plurality of light emitting elements;
    a power supply device;
    a converter configured to supply a driving voltage to the plurality of drivers of each of the plurality of display modules based on a direct voltage output by the power supply device; and
    a processor configured to:
        determine whether the direct voltage output by the power supply device and provided to the converter reaches a predetermined voltage,
        detect that a voltage supplied to the power supply device was turned off based on determining that the direct voltage output by the power supply device and provided to the converter reaches the predetermined, and
        based on detecting that the voltage supplied to the power supply device was turned off, provide a reset signal for resetting the plurality of drivers to the plurality of drivers of each of the plurality of display modules.

2. The modular display device of claim 1, wherein the processor comprises:
    a detection circuit configured to, based on the voltage output by the power supply device being reduced as the voltage supplied to the power supply device was turned off and reaching the predetermined voltage, output the reset signal for resetting the plurality of drivers.

3. The modular display device of claim 2, wherein the detection circuit is further configured to:
    detect whether the voltage output by the power supply device is reduced and reaches the predetermined voltage by using a Zener diode, and
    wherein a breakdown voltage of the Zener diode is the same as the predetermined voltage.

4. The modular display device of claim 2, wherein the detection circuit comprises:
    a Zener diode comprising an anode terminal and a cathode terminal that is configured to receive an input of the voltage output by the power supply device;
    a first resistance comprising a first end connected to the anode terminal of the Zener diode and a second end;
    a second resistance comprising a first end connected to the second end of the first resistance and of which a second end of the second resistance connected to a ground;
    a capacitor comprising a first end commonly connected to the second end of the first resistance and the first end of the second resistance, and a second end connected to the ground;
    a third resistance comprising a first end configured to receive an input of a first voltage and a second end; and
    an AND gate comprising a first input end connected to the second end of the third resistance, a second input end commonly connected to the second end of the first resistance, the first end of the second resistance, and the first end of the capacitor, and an output end configured to output the reset signal.

5. The modular display device of claim 4, wherein the AND gate is configured to:
    based on the voltage output by the power supply device being reduced and reaching the predetermined voltage, output the reset signal having a low level.

6. The modular display device of claim 1, wherein the plurality of drivers are further configured to:
    based on the reset signal being received, stop operations according to the reset signal.

7. The modular display device of claim 1, wherein the processor is further configured to detect whether the power supplied to the power supply device was turned off by detecting whether a plug of the power supply device was detached from a receptacle.

* * * * *